US007145849B2

(12) United States Patent
Chang et al.

(10) Patent No.: US 7,145,849 B2
(45) Date of Patent: Dec. 5, 2006

(54) METHOD TO REDUCE THE OFFSET COMPONENT OF TRACKING ERROR IN AN OPTICAL DISC PLAYER

(75) Inventors: Chia-Yen Chang, Taipei (TW); Hsin-Ping Cheng, Taipei (TW)

(73) Assignee: Lite-On It Corporation, Taipei (TW)

( * ) Notice: Subject to any disclaimer, the term of this patent is extended or adjusted under 35 U.S.C. 154(b) by 414 days.

(21) Appl. No.: 10/709,853

(22) Filed: Jun. 2, 2004

(65) Prior Publication Data

US 2005/0270921 A1 Dec. 8, 2005

(51) Int. Cl.
*G11B 7/00* (2006.01)

(52) U.S. Cl. .............................. 369/44.41; 369/44.32; 369/44.28

(58) Field of Classification Search ..................... None
See application file for complete search history.

(56) References Cited

U.S. PATENT DOCUMENTS 5,914,922 A * 6/1999 Supino et al. ........... 369/44.28
2003/0133374 A1* 7/2003 Murata et al. ........... 369/44.35

* cited by examiner

*Primary Examiner*—Muhammad Edun
(74) *Attorney, Agent, or Firm*—Winston Hsu

(57) ABSTRACT

A method of tracking error correction, primarily for utilization in optical disc drives using single beam optical pick-up heads. Delinearization in the tracking servo of a single beam optical pick-up head, contributed to by inherent design properties, is minimized by extracting a value proportional to a tracking error signal offset component from a tracking servo demand signal, applying a scaling factor to match the scaling applied to the tracking servo demand signal with scaling applied to the amplified tracking error signal, and subtracting the product of this function from the source signal i.e. the tracking error signal. The modified source signal, following this operation, has a reduced order of tracking error offset.

16 Claims, 10 Drawing Sheets

METHOD TO REDUCE THE OFFSET COMPONENT OF TRACKING ERROR IN AN OPTICAL DISC PLAYER

BACKGROUND OF INVENTION

1. Field of the Invention

The invention relates to an error correction system for an optical disc drive, and in particular, to an error correction system for correcting tracking error.

2. Description of the Prior Art

Optical disc drives are becoming more popular in the market, and have been considered standard equipment on personal computers for several years. Generally speaking, optical disc drives are used to read information stored on an optical disc. Examples of optical disc drives are known as compact disc drives (CD-ROM drives) and digital versatile disc drives (DVD-ROM drives) in the prior art. Some optical disc drives have the additional capability of being able to write data onto an optical disc, i.e., CD-RW and DVD-RW drivers. Optical disc drives are used in music and video playback and are implemented in recording devices and other electronic devices.

Optical discs store data as a continuous track of 'pits' and 'lands' (a land area being simply a part of the track where there is no pit) on a data-bearing surface that is rendered reflective by the application of a metallic layer during manufacture. The continuous data track is formed on the optical disc in an Archimedean spiral, the start of the data area being toward the center of the disc and so in most cases data is read back from inner radii to outer radii. Pits are formed either by producing physical indentations in the data bearing surface of the disc, as is the case for ROM discs, or by 'phase-changing' the special dyes used to coat the data bearing surface of recordable format discs. In contrast to previous technologies like gramophone playback systems, with optical discs there is no physical contact between the playback mechanism and data-bearing surface, rather, the processes of following the data track and reading the data thereon is achieved optically.

The optical pick-up head of an optical disc drive uses returned light from a laser, focused on the data-bearing surface of the optical disc, to sense the pit and land areas along the continuous data track as varying levels of returned light. Please refer to FIG. 1, this shows DVD pit 11, land 12 and track structure on the data-bearing surface of an optical disc 10 with read laser spot 13 superimposed. In order to read the abovementioned data, the read laser spot 13 must be positioned over the center of the continuous data spiral, or track. The servos chiefly responsible for directing the read laser, or read/write laser in the case of recordable optical disc drives, are the focus servo and the tracking servo; it follows that a high degree of accuracy is required from both of these systems. As the name suggests, the purpose of the focus servo is to establish and maintain focus of the read laser 'spot' 13, which is typically 0.9–1.0 μm in diameter for DVD pick-up heads, on the data-bearing surface of the optical disc 10 by moving the pick-up head objective lens axially. The purpose of the tracking servo is to find the data track and keep the read laser spot 13 centered about it. If the read laser spot 13 radial position is not maintained central to the data track, because track separation in the radial direction (hereinafter 'track pitch') is just 740 nm for DVD, the read laser might 'see' pit data from adjacent tracks, though before the mis-tracking of the data became serious enough to create these conditions, the quality of the data signal would likely degrade to the point of being useless because the data signal processing circuitry would not be able to adequately determine the pit/land relationship.

FIG. 2 shows a schematic diagram of a typical optical disc drive pick-up head. Light from a laser 201 is collimated into a beam by a lens 202, a proportion of the light is reflected by a polarized plane of a polarizing beam splitter (PBS) 203 onto a photo-detector 204, while the remaining light is reflected by a mirror 207 and focused onto an optical disc 10 by an objective lens 208. Light reflected by the optical disc 10 follows a return path which is the reverse of that stated above, until the light reaches the PBS 203, where returning light is reflected by the polarized plane of the PBS 203, through a lens 205 and onto a photo-detector 206. The photo-detector 204 is dedicated to the task of sensing laser power, and while the primary task of the photo-detector 206 is to read disc information.

Centering of the read spot 13 over the data track, or 'tracking', is achieved by detecting a bias in the average of the returned light. The returning light beam is directed to a split photo-detector 206, so orientated in the radial direction that when the read spot is centered on the data track, the outputs from both halves of the photo-detector will be equal. FIG. 3 shows the make up of the reflected beam in terms of the diffracted orders. The closely arranged adjacent tracks of data on an optical disc 10 act as a diffraction grating, and as such, in addition to the normally reflected 'zero order' diffracted beam, 1st and 2nd order diffracted beams and corresponding −1st and −2nd order diffracted beams are generated at angles according to the track pitch of the disc data and the wavelength of the read laser 201. Land area 12 acts as a mirror and returns a maximum amount of light to the pick-up head 20, while pits 11, generally having a depth of approximately λ/4, where λ=the wavelength of the read laser 201, return significantly less light. This is because during the return journey to the bottom of the pit 11 the read laser light travels a distance approximately equivalent to λ/2, and therefore undergoes a 180° phase shift relative to the light reflected by the surrounding land area. Destructive interference occurs between the two phases mixing in the returning light path and the above-mentioned reduction in returned light level results. If then, referring to FIG. 3, the read laser spot 13 drifts away from the centerline of the data track, e.g. point P moving leftward with respect to point Q, the +1st order refracted beam falling on the right hand side of the photo detector 206 (206R) would gain intensity as more land area 12 to the left of Q falls under the read laser spot 13. Similarly, the 1st order diffracted beam falling on the left hand side of the photo detector 206 (206L) would decrease in intensity as less land area 12 to the right of Q falls under the read laser spot. Hence movement of the read laser spot 13 away from the center of the data track is manifest in a differential bias in the outputs of the split photo-detector 206, the differential being equivalent to the amount of deviation and the sense indicative of the direction of deviation.

FIG. 4 shows a basic implementation of a tracking servo 40 using the above principle; the output of the biased elements of the split detector 206 are amplified differentially by an amplifier 41, the resulting signal, being known as tracking error (TE) 45, is then further processed by a tracking compensator 42 to produce an appropriate tracking demand signal (TRO) 46, which in turn is used to drive an objective lens 44 via force coils 43 installed thereon. The mode of operation of the tracking servo 40, is controlled by a digital signal processor (DSP) 47, or similarly capable device. If tracking is selected, the tracking compensator 42 will use the tracking error signal 45 to generate a tracking demand signal 46 to drive the objective lens 44 to initially acquire, and once acquired, maintain position over the data track via the force coils 43 (i.e. the objective lens will follow the data track). The tracking error signal 45, and changes therein, are constantly cycled through a critically damped servo loop formed from the above, with the aim of maintaining the tracking error signal 45, and therefore objective lens displacement from the center of the data track, at a minimum. This method is known as push-pull (PP) tracking. If tracking is not selected, then the tracking compensator 42 will use low-pass filtered tracking error 52 (FIG. 5), derived from the tracking error signal 45, to generate a tracking demand signal 46 to hold stationary or reposition the objective lens 44 in some modes, particularly during operations such as 'seek' operations, wherein the objective lens must skip a predetermined number of data tracks.

The only moving part in the pick-up head optical path is the objective lens 44 and its housing, which is generally suspended from fine wires and manipulated by integral force coils 43 that react against permanent magnets mounted on the pick-up head 20 housing. The objective lens 44 housing is allowed to move axially for focus, laterally in the radial sense for tracking, but is restricted laterally in the tangential sense.

The above description of the optical path has two important implications: in that the optical path is static apart from the objective lens 44, and that the objective lens 44 housing is suspended from what are effectively swingarms. This means that as the objective lens 44 moves, not only will angles and distances within the optical path alter, but so will the azimuth alignment of the objective lens 44 relative to the optical disc 10. This in turn will affect the way in which the returning light falls upon the split photo-detector 206 thereby inducing an offset, known as tracking error offset, by which the output of the split photo-detector 206 will vary with changes in objective lens 44 position. FIG. 5 shows the tracking error waveform 51 (45) generated as the objective lens 44 sweeps (while in focus) radially across the optical disc 10; each full cycle represents one track on the disc. It can be seen that a DC offset 52 (45 of FIG. 4), is apparent in the mean plot of the tracking error sine wave 51 (45 of FIG. 4), this is tracking error offset. It can be seen then, that in either mode of tracking servo 40 operation mentioned above i.e. tracking 'on' or tracking 'off', the objective lens 44 will not be optimally positioned because of the offset present in the tracking servo 40.

FIG. 6 shows tracking error offset 52 in isolation as it may appear as the output of a low-pass filter (LPF). Depending upon the scaling of amplifier gains, the properties of the read laser 201 and photo-detector(s) 206 used in the tracking servo 40 and the sensitivity of the objective lens force coils 43, the tracking demand signal (TRO) 46 may be larger or smaller than the tracking error signal 45. Hence, the tracking error offset component present in the tracking demand signal (TRO) 46 will be correspondingly larger or smaller. Seen here are two possible representations of TRO 46, annotated TRO1 (LPF) 61 & TRO2 (LPF) 62, as produced by low-pass filtering set in relation to the tracking error offset component 52.

Correcting for tracking error offset 61 optically would be expensive in terms of both additional optical components and increased manufacturing times, so the tracking error signal 51 is generally modified electrically, although attempts have been made in the prior art to resolve the problem in an opto-mechanical fashion (see U.S. Pat. No. 5,612,936, which is included herein by reference), or else by changes to the structure of the photo-detector 206 itself (see U.S. Pat. No. 6,580,670, which is included herein by reference). Further and more widely used systems have been developed in prior art to circumvent tracking problems; three beam or multi-beam systems operate by splitting the read laser 201 beam into a main beam and at least two 'sub-beams' by use of a diffraction grating. The sub-beams return light to dedicated photo-detectors in the pick-up head, the outputs of which are resolved differentially against the overall output of the main beam photo-detector by a methodology that has no inherent offset. However, the inclusion of additional optics again increases expense and lowers the efficiency of the optical path, and such a system would require the sub-beams to be masked before any write operation could be carried out, as the sub-beams would duplicate the write data at either side of the data track causing ghosting.

Hence, it is an object of the present invention to provide a method of characterizing and correcting tracking error offset 61 in an optical disc drive suitable for reading from, and writing to, an optical disc 10.

SUMMARY OF INVENTION

It is an object of the present invention to provide a method for characterizing and correcting tracking error offset in an optical disc drive.

In order to accomplish the object of the present invention, the present invention provides a method of extracting a value proportional to a tracking error signal offset component from a tracking servo demand signal, applying a scaling factor to said offset component and subtracting the product of this function from the source signal.

The output of a tracking compensator circuit is passed through a low pass filter circuit, the output of which being proportional to any uncorrected DC offset component present in the input to the tracking compensator. In order to scale the proportional value for equivalence to the originating DC component in the tracking compensator input, the proportional value is multiplied by a pre-determined factor in an amplifier stage, then subtracted from the originating signal, i.e. the tracking error input to the tracking compensator, by a further amplifier stage thus perpetually seeking to null the error by negative feedback.

These and other objectives of the claimed invention will no doubt become obvious to those of ordinary skill in the art after reading the following detailed description of the preferred embodiment that is illustrated in the various figures and drawings.

DETAILED DESCRIPTION

Although the embodiments of the present invention are described below in connection with internal DVD-ROM drives, the present invention can be applied to all optical disc drive types including but not limited to CD-ROM drives, CD-RW drives, DVD-RAM drives, DVD-RW drives, DVD+RW drives, COMBO drives, car audio players, external drives, as well as all other optical media recorders and players. Being relevant to optical disc drives utilizing the push-pull method for tracking servo control, the present invention is most applicable, but not limited to, optical disc drives with 'single beam' optical pick-up heads.

Figure 7:
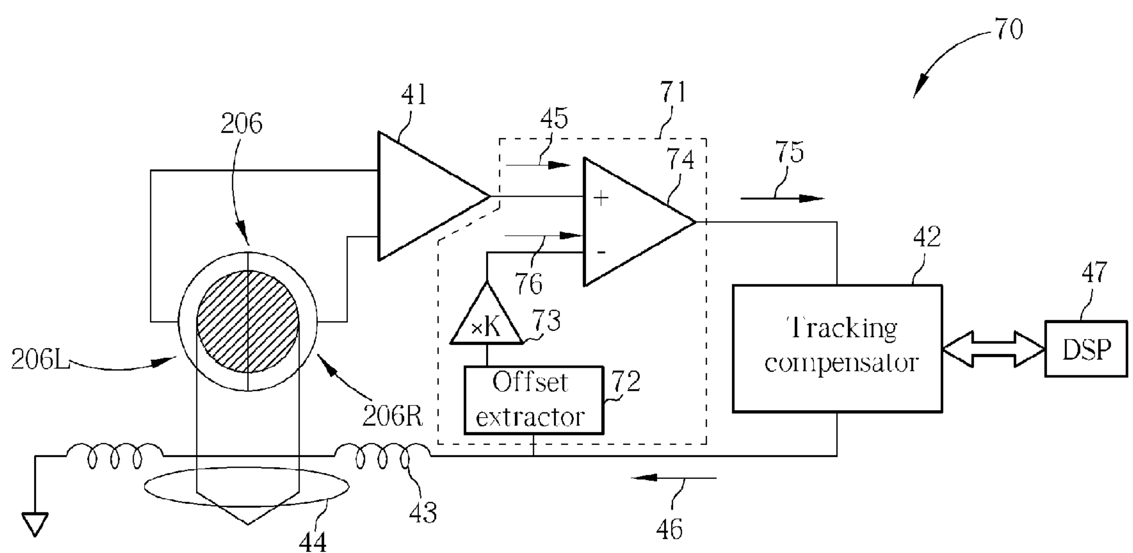
FIG. 7 illustrates an embodiment of a present invention tracking circuit.
Figure 10:
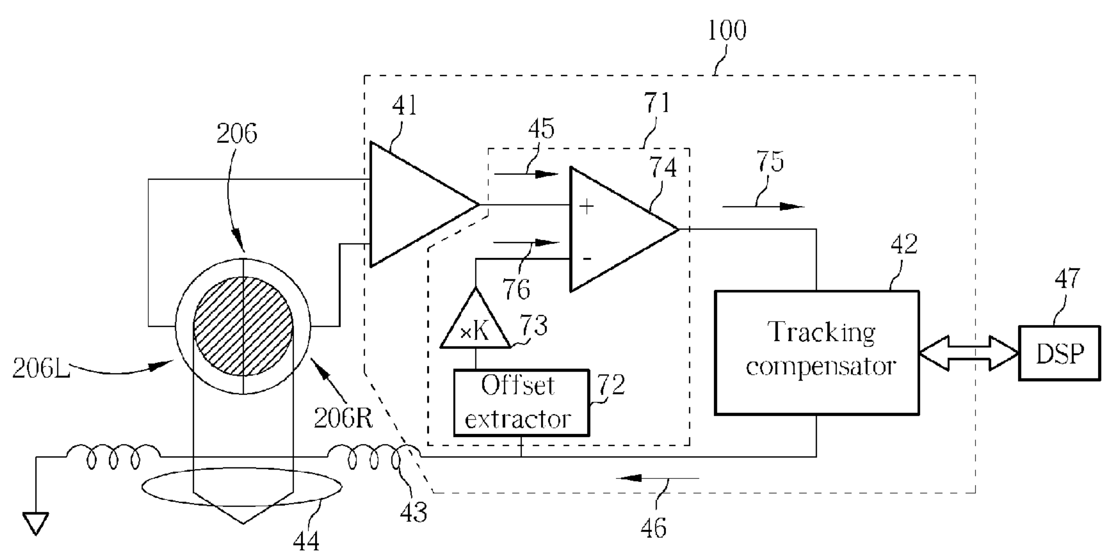
FIG. 10 illustrates a tracking error waveform with reduced DC offset component according to the present invention.

FIG. 7 shows an embodiment 70 of the present invention implemented using relatively discrete devices, as compared to other embodiments, such as FIG. 10, which can be implemented using one or more programmable devices.

Figure 1:
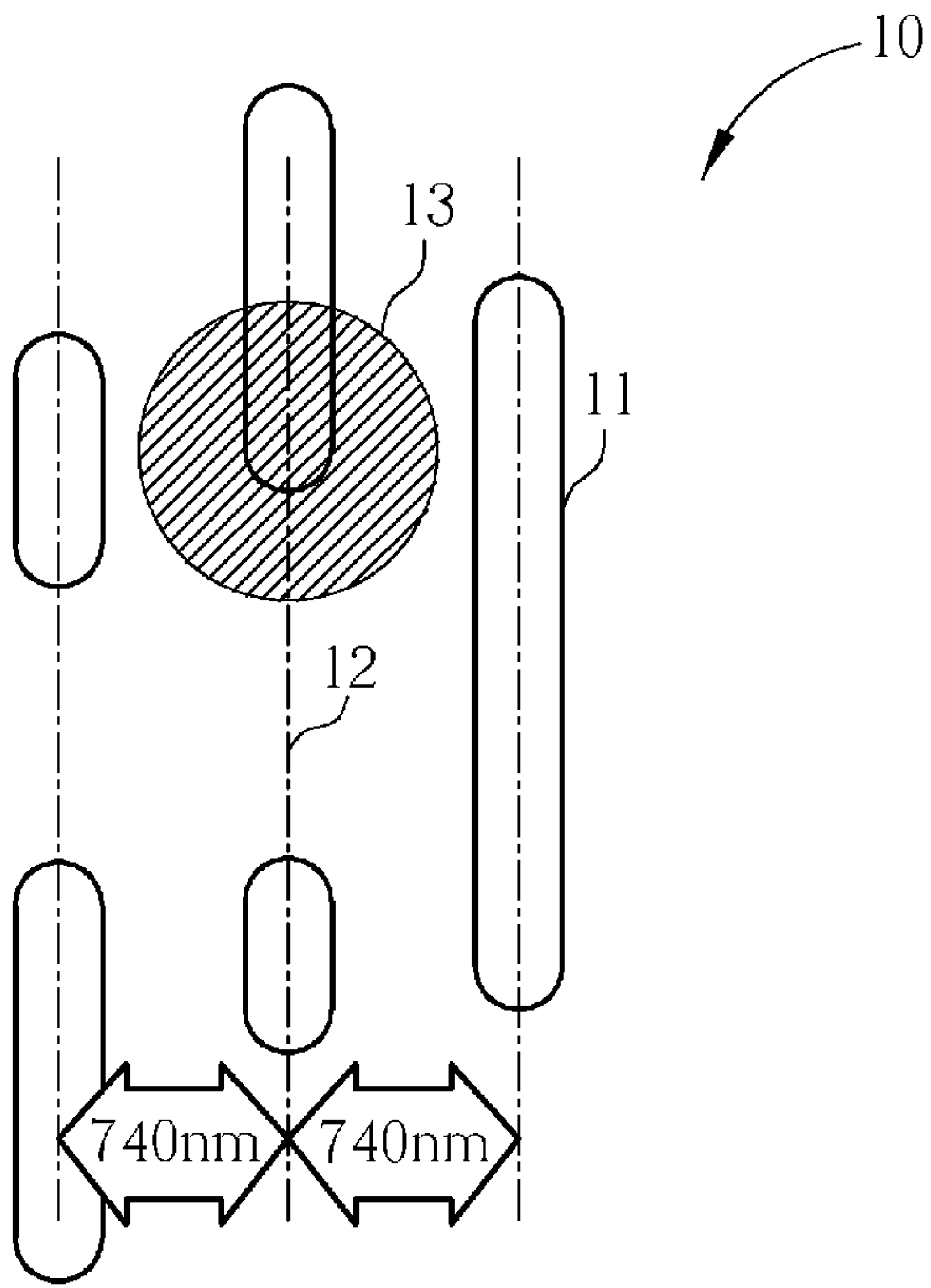
FIG. 1 shows the arrangement of pit/land data on a conventional optical disc.
Figure 2:
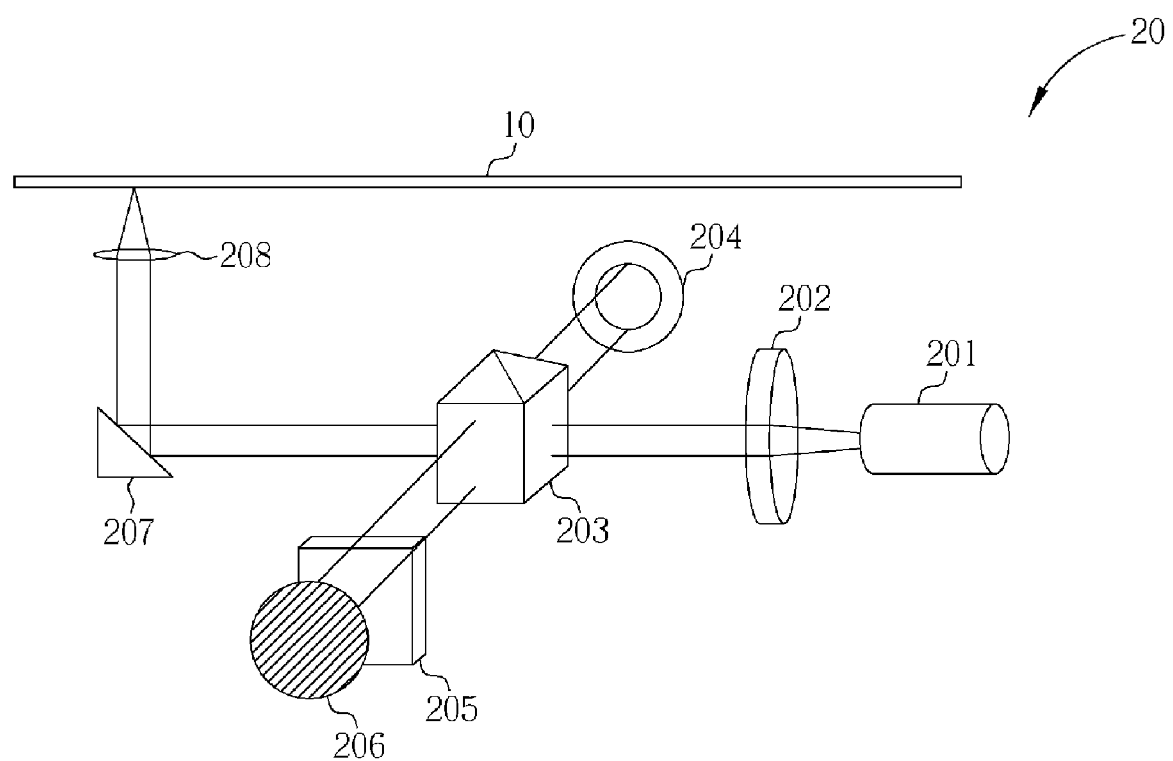
FIG. 2 is an internal block diagram of a typical optical pick-up head.
Figure 3:
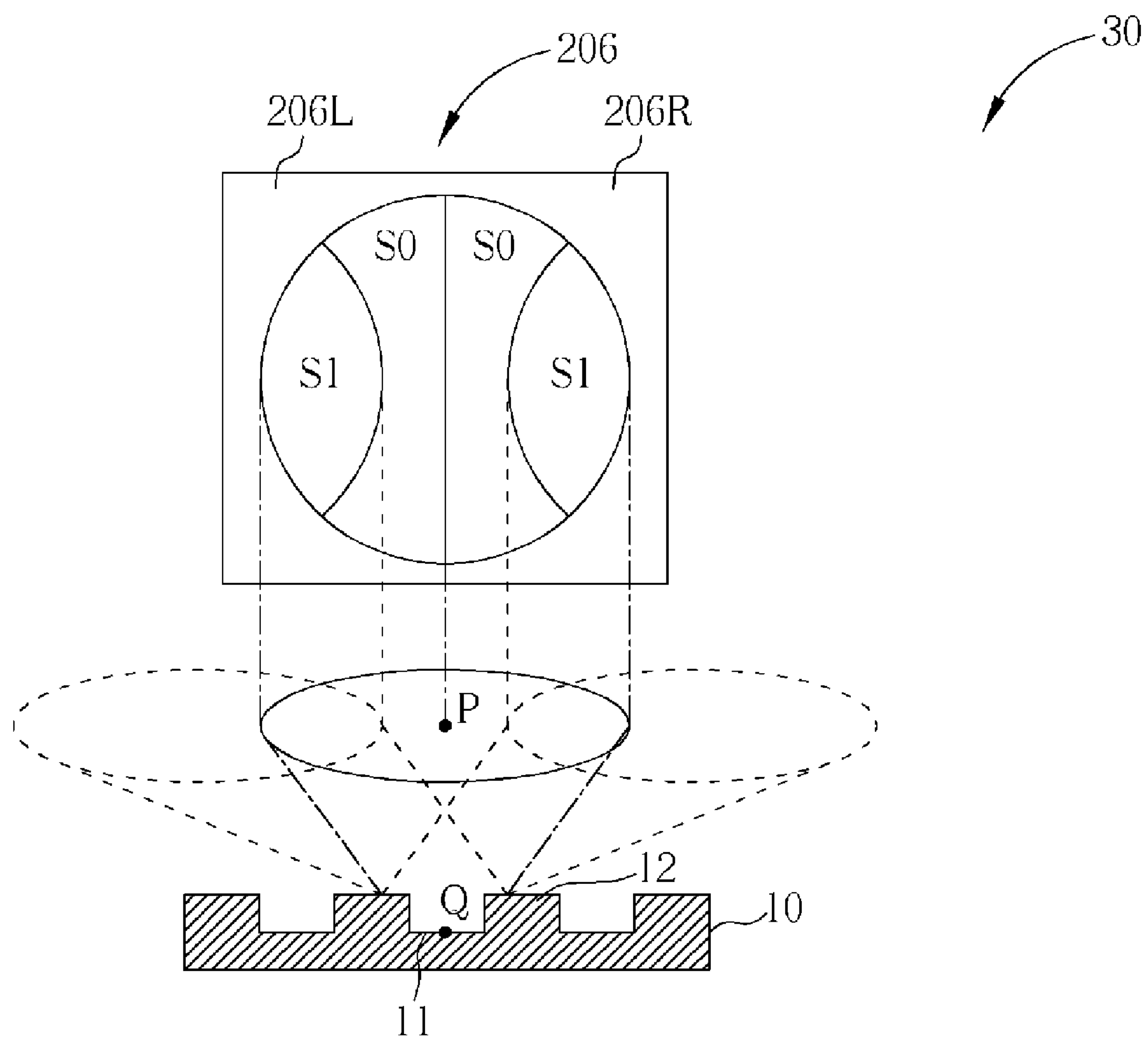
FIG. 3 is a diagrammatical explanation of push-pull (PP) tracking theory according to the prior art.
Figure 4:
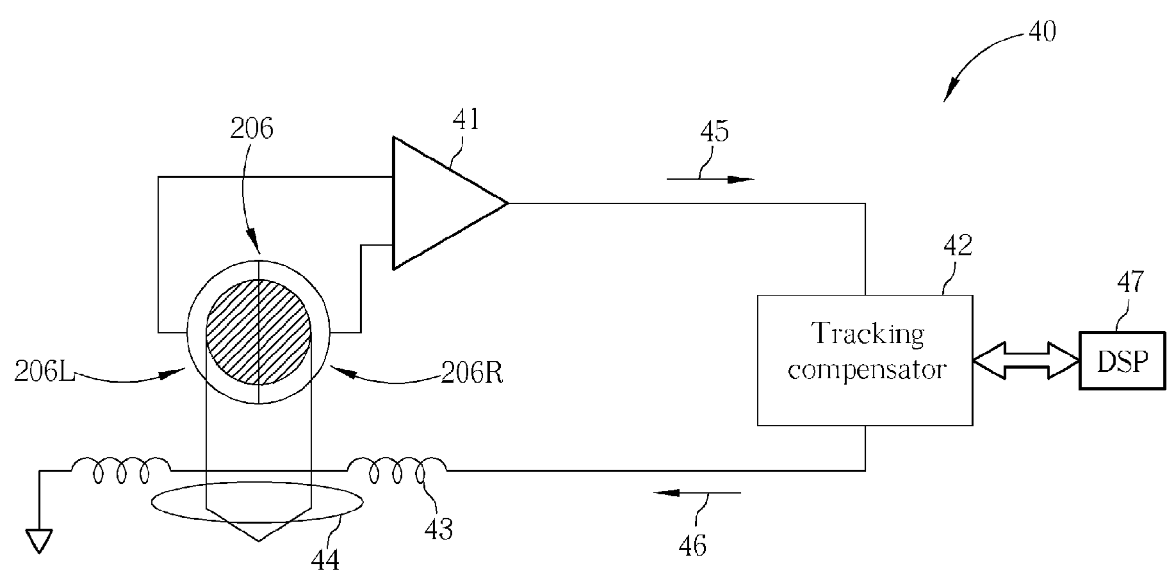
FIG. 4 is a schematic rendering of push-pull tracking circuit implementation according to the prior art.
Figure 5:
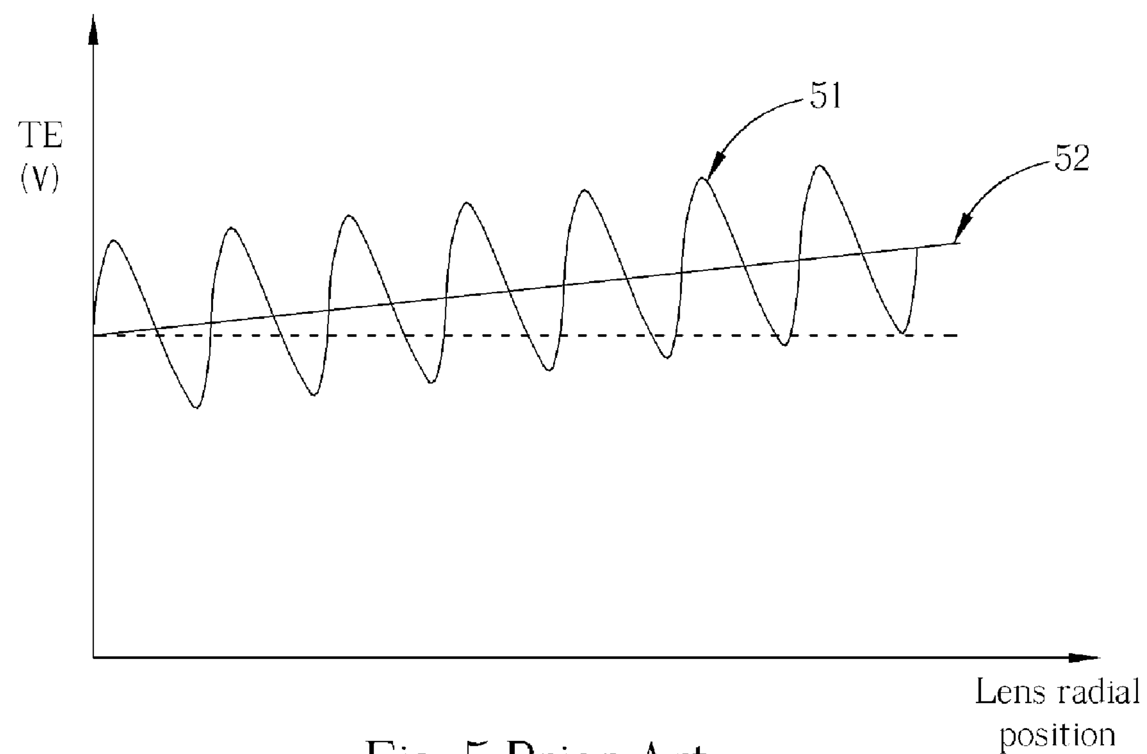
FIG. 5 illustrates a conventional tracking error waveform with DC offset component.

Referring to FIG. 7, the circuit 70 includes a split detector 206 having left and right sides 206L, 206R, a differential amplifier 41, a tracking offset corrector 71, a tracking compensator 42, an objective lens 44, and force coils 43. The tracking compensator 42 can be further connected to a digital signal processor (DSP) 47 or similarly capable device. The tracking offset corrector 71 includes an offset extractor 72 (such as a low-pass filter), a scaling amplifier 73, and a summing amplifier 74 mutually connected as shown. The circuit 70 performs operations similar to those of the circuit 40 of FIG. 4, which will not be repeated here. Operation of the circuit 70 according to the present invention is detailed as follows.

A tracking error signal 45 is generated by the amplified output of the photo detector 206 by well-known means such as those described in the prior art. Before passing to the tracking compensator 42, the signal is summed with a tracking offset correction signal 76 (the nature of which will be discussed below and for the sake of clarity should be disregarded at present), in the summing amplifier 74. From the amplifier 74, a modified signal 75 passes to the tracking compensator 42. Although the signal 75 is modified it can, for simplicity, be considered as being tracking error + offset 51 (shown as 45) until the remainder of the circuit is understood. If tracking is selected, the tracking compensator 42 will use the modified tracking error signal 75 to generate a tracking demand signal 46 to drive the objective lens 44 to a null position via the force coils 43. Hence when tracking is selected, the objective lens will be maintained in a position above a particular instance of the data track, central to the pit data on the optical disc 10 (i.e. the objective lens will follow the data track). If tracking is not selected, then the tracking compensator 42 will use low-pass filtered tracking error 52, derived from the modified tracking error signal 75, to generate a tracking demand signal 46 to hold stationary or reposition the objective lens 44 in some modes, particularly during operations such as 'seek' operations, wherein the objective lens must skip a predetermined number of data tracks.

Figure 6:
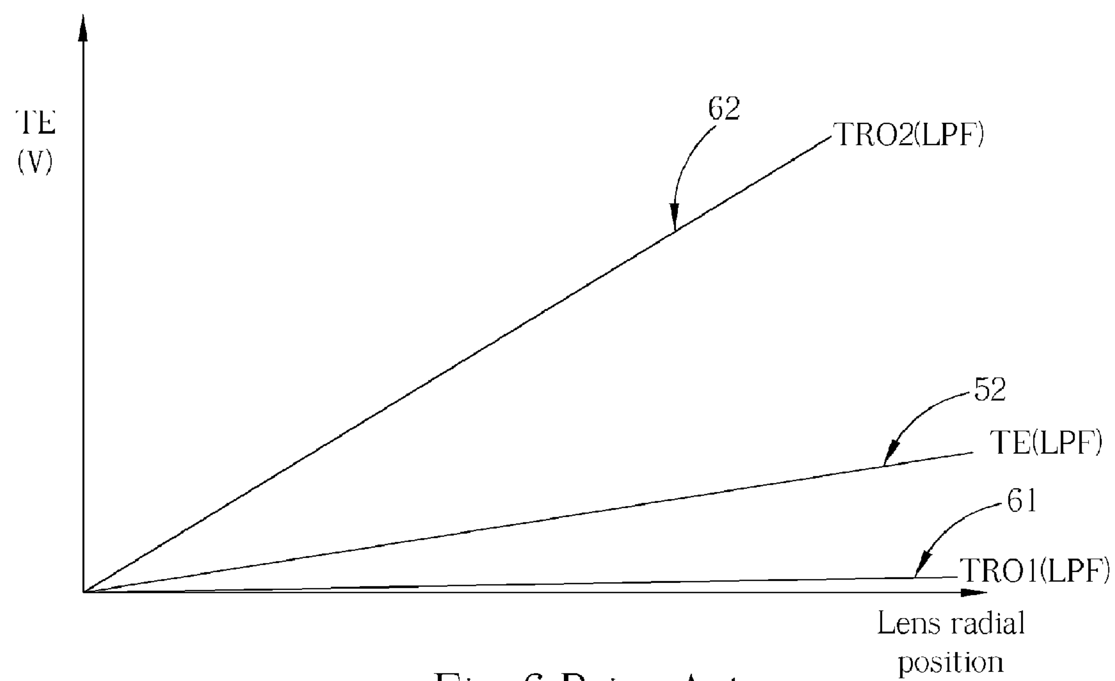
FIG. 6 illustrates a low pass filtered DC offset component according to the prior art.

A component proportional to tracking error offset will be present in the tracking demand signal 46, this component can be isolated by passing the tracking demand signal 46 through the offset extractor 72 of the tracking offset corrector 71 of the present invention. Please refer again to FIG. 6; the output of the offset extractor 72 can be represented by TRO1 (LPF) 61, TRO2 (LPF) 62 or another linear plot sharing the same origin, the gradient of which being dependent upon the scaling factors used throughout the system. In the following, the representation of TRO annotated TRO1 (LPF) 61 is used and being the only instance of TRO (LPF) being considered, to avoid ambiguity, is simply referred to as "TRO (LPF) 61". The relationship between the respective DC values TRO(LPF) and TE(LPF) is a direct multiple, it is this multiple that is stored in the scaling amplifier 73 as the value 'k'. The value of 'k' may be determined once only at the time of manufacture of the optical disc drive, though it may be preferable to redetermine 'k' for every disc played. The value of 'k' can be determined by sweeping the objective lens across its range of radial movement and storing the values of TRO(LPF) 61 and TE(LPF) 52 vs. objective lens 44 position. The average values of TRO(LPF) 61 and TE(LPF) 52 are calculated and 'k' is taken as TRO(LPF) 61 divided by TE(LPF).

Figure 8:
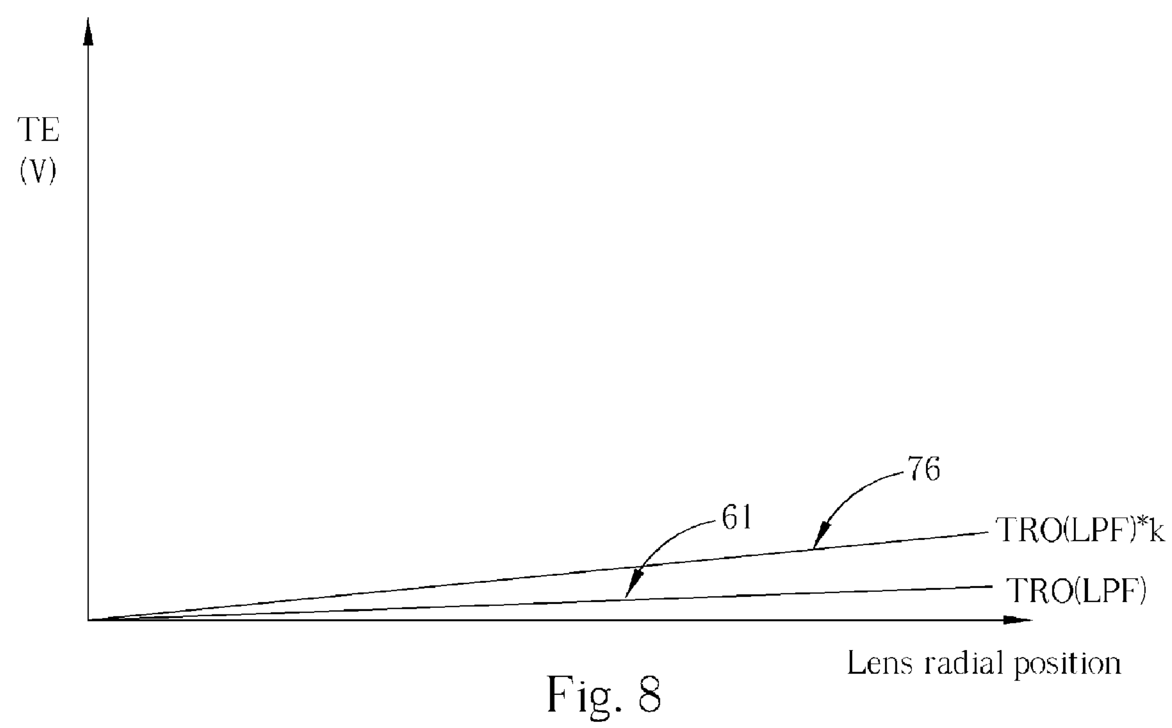
FIG. 8 is a graph of tracking error offset according to the present invention.

The TRO(LPF) 61 signal passes from the offset extractor to the scaling amplifier 73 where it is treated with the scaling factor 'k', thereby becoming k*TRO(LPF) and being transformed from a proportional value into a tracking offset correction signal 76 with an equivalent DC component to the original tracking error signal. FIG. 8 illustrates the tracking error correction signal 76.

Figure 9:
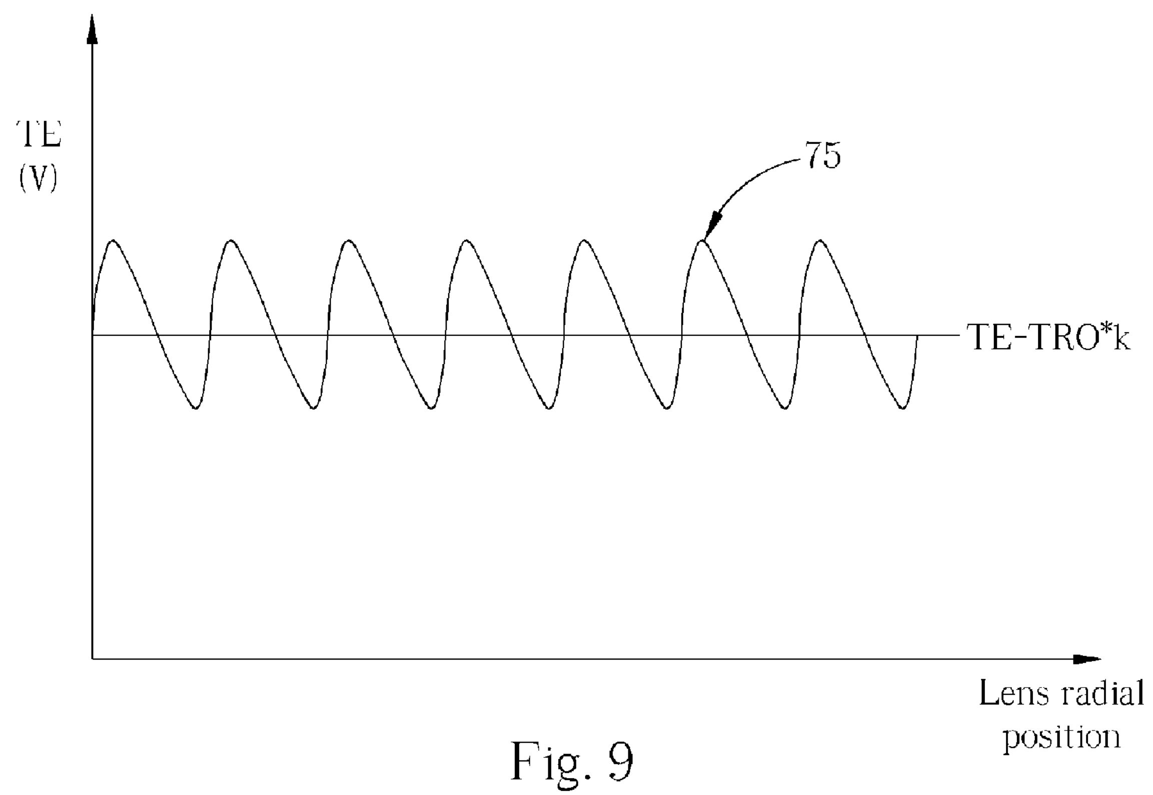
FIG. 9 illustrates an extracted proportional tracking error offset scaled for equivalence according to the present invention.

The tracking offset correction signal 76 is subtracted from the tracking error signal 45 by the summing amplifier 74, the modified tracking error signal 75 being TEk*TRO(LPF), hence the tracking compensator 42 is passed a signal with reduced tracking error offset. FIG. 9 illustrates the modified tracking error signal 75. A feature of this arrangement is its ability to correct for any additional offset(s) that may be introduced by the tracking compensator 42.

FIG. 10 shows an embodiment of the present invention wherein the servo circuitry is realized using at least one programmable device 100, however, function remains the same as for the embodiment described above.

Those skilled in the art will readily observe that numerous modification and alternation of the device may be made while retaining the teaching of the invention. Accordingly, the above disclosure should be construed as limited only by the metes and bounds of the appended claims.

What is claimed is:

1. A method for reducing tracking error offset in an optical disc drive comprising the following steps:

(a) extracting a value proportional to a tracking error offset in a tracking error signal;

(b) scaling the output of step (a) to match the scaling applied to the amplified tracking error signal; and (c) subtracting the output of step (b) from the tracking error signal.

2. The method of claim 1, wherein the output of step (a) is derived from an objective lens drive signal.

3. The method of claim 1, wherein the scaling factor of step (b) is calculated by dividing an output of a tracking compensator by an input of the tracking compensator.

4. The method of claim 3, wherein the values of tracking compensator output and tracking compensator input are average values determined during a predetermined movement of an objective lens.

5. The method of claim 1, wherein the scaling factor used in step (b) is recalculated whenever a disc to be played back/written to is changed.

6. The method of claim 1, wherein the tracking error signal is derived from a single beam optical pick-up head.

7. An optical disc drive tracking servo circuit comprising:

a photo-detector connected to an operational amplifier;

a tracking compensator connected to an objective lens actuator; and a tracking error corrector connected between an output end of the operational amplifier, an input end of the tracking compensator, and an output end of the tracking compensator, the tracking error corrector comprising an offset extractor for extracting a value proportional to a tracking error offset in a tracking error signal, the offset extractor being connected to a scaling amplifier for scaling the output of the offset extractor to match the scaling applied to the amplified tracking error signal, the scaling amplifier being connected to a summing amplifier for subtracting an output of the scaling amplifier from an output of the operational amplifier.

8. The optical disc drive tracking servo circuit of claim 7, wherein the offset extractor is a low pass filter.

9. The optical disc drive tracking servo circuit of claim 7, wherein some or all of the electronic circuits are implemented in programmable devices.

10. The optical disc drive tracking servo circuit of claim 7, wherein a scaling factor of the scaling amplifier is derived from dividing an output of the tracking compensator by an input of the tracking compensator.

11. The optical disc drive tracking servo circuit of claim 7, wherein an optical pick-up head from which a tracking error signal is derived, is of a single beam type.

12. A method for reducing tracking error offset in an optical disc drive comprising the following steps:

(a) extracting a value proportional to a tracking error offset in a tracking error signal from an objective lens drive signal;

(b) scaling the output of step (a) to match scaling applied to the amplified tracking error signal by a factor derived from dividing an output of a tracking compensator by an input of the tracking compensator; and (c) subtracting an output of step (b) from the tracking error signal.

13. The method of claim 12, wherein the scaling factor used in step (b) is recalculated whenever a disc to be played back/written to is changed.

14. The method of claim 12, wherein values of the tracking compensator output and tracking compensator input are average values determined during a predetermined movement of an objective lens.

15. The method of claim 14, wherein the scaling factor used in step (b) is recalculated whenever a disc to be played back/written to is changed.

16. The method of claim 12, wherein the tracking error signal is derived from a single beam optical pick-up head.

* * * * *